(No Model.)
L. J. CRECELIUS.
LIFTING JACK.
No. 407,173. Patented July 16, 1889.
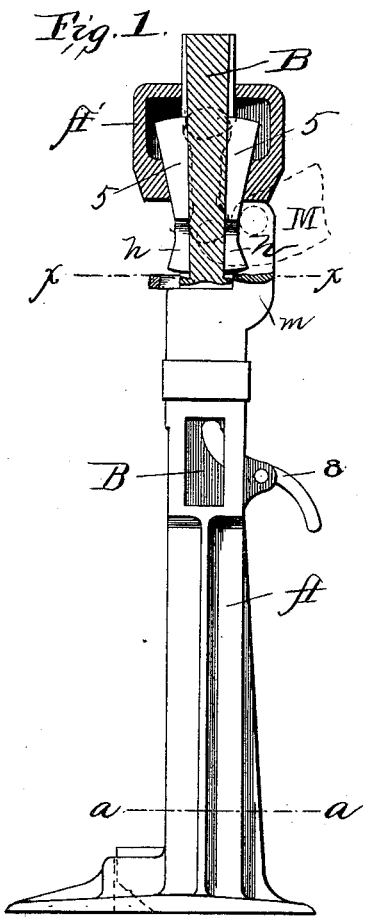
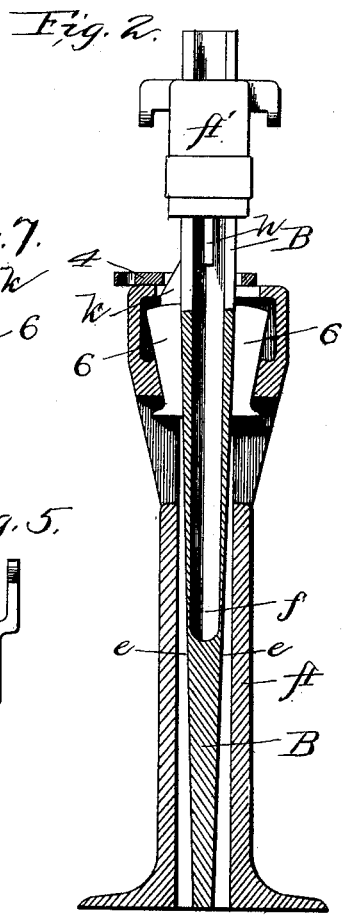
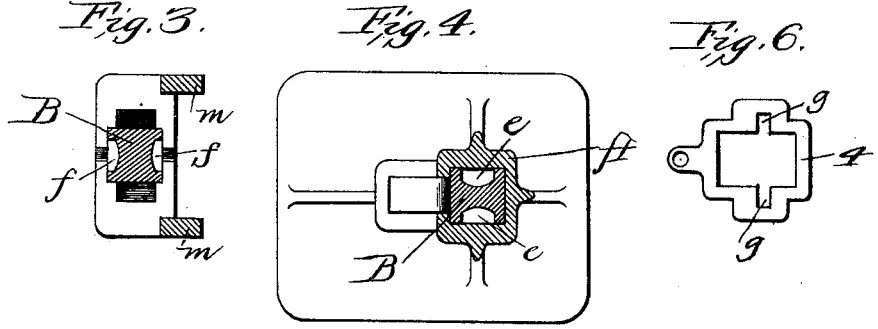
Witnesses
Walter Greene
F. L. Middleton
Inventor
Louis J. Crecelius
By Ellis Spear
Attorney

UNITED STATES PATENT OFFICE.

LOUIS J. CRECELIUS, OF ST. LOUIS, MISSOURI, ASSIGNOR TO ANDREW WARREN, OF SAME PLACE.

LIFTING-JACK.

SPECIFICATION forming part of Letters Patent No. 407,173, dated July 16, 1889.

Application filed May 15, 1889. Serial No. 310,846. (No model.)

*To all whom it may concern:*

Be it known that I, LOUIS J. CRECELIUS, of St. Louis, State of Missouri, have invented a new and useful Improvement in Lifting-Jacks; and I do hereby declare that the following is a full, clear, and exact description of the same.

My invention is an improvement in lifting-jacks of that class in which the lifting-bar moves in the channel of a standard, and is provided with a lifting-head raised by a lever mounted on the standard and with grips in the standard and the head.

The invention includes, first, an improvement in the form of lifting-bar shown in Letters Patent granted to me by the United States Patent Office on the 29th of May, 1888, No. 383,710, and, secondly, the invention consists in wedged gripping devices combined with special form of releasing devices.

In the accompanying drawings, Figure 1 represents a side elevation of the lifting-jack, with the head in section. Fig. 2 is a similar view of the jack one-quarter turned, with the standard in vertical section and the head in elevation. Fig. 3 is a horizontal section on line $x\ x$ of Fig. 1. Fig. 4 is a section on line $a\ a$ of Fig. 1. Fig. 5 is a plan view of the releasing-lever. Fig. 6 is a plan view of the releasing-slide. Fig. 7 is a detail representing a detached view of one of the lower grips.

In the drawings, A represents the standard, which in its general form and construction is like that shown in my aforesaid patent and like those commonly used, differing only in respect to the parts about the releasing device. The lifting-bar is shown at B. This is also like that shown in my said patent, excepting in respect to the taper. In that patent I show a tapering bar in which the taper is uniform from top to bottom, and therefore both grips—that is to say, the grip in the standard and the grip in the head—operate on the same taper of the bar. The head containing the lifting-grips is shown at A', and is also of the general construction commonly used. The object of this part of my invention relating to the bar is for the purpose of either obtaining the same pitch or taper on a shorter distance or of obtaining a greater pitch or taper in the same distance. The taper for each grip is in length preferably proportioned to the amount of vertical movement of the bar in lifting. In the form of jack shown in the drawings I use a double grip, and this requires a taper on both sides of the bar.

In Fig. 2 the bar is shown in its place in the lower position. The taper sides which are acted upon by the standard-grips are marked $e\ e$, and extend from about midway to the lower end. The tapers for the head-grips are on the sides adjoining the opposite sides $e\ e$. One is shown at $f$, and the other is on the side opposite to $f$. These tapers are from the upper end of the bar downward, and they are acted upon by the grips in the head, (shown in Fig. 1,) as is also the upper part of the bar having the taper $f$. I have shown in connection with these tapering sides of the lifting-bar wedge-shaped gripping devices 6. These gripping devices act automatically in lifting in the step-by-step movement through the lifting action of gravity, force being applied to the head through the lever M, pivoted in ears $m$ on the standard of the jack. In order that the load may be lowered, these wedges must be raised. This is accomplished by means of the treadle-lever 8, pivoted on the standard, which lever is forked on its inner end to embrace the bar, and the inner ends of the fork bear against the lower ends of the wedges 6, so that downward pressure on the outer end of lever 8 will raise the wedges and release the grip. In order to release the upper grip at the same time, I have provided a sliding plate 4. The position of this is shown in Fig. 2 and the shape more fully in Fig. 6. It permits the movement of the lifting-bar, which it surrounds, and it lies directly upon the upper end of the standard. The opening in the plate is elongated in one direction, so as to allow it to move back and forth on the standard. In the plate are two rectangular notches $g\ g$, which, when the plate is in normal position, register with prolongations $h$ on the lower ends of the head-gripping wedges 5 5, so that these wedges can drop down when the head is lowered the full length necessary to maintain the grip; but when the sliding plate 4 is out of its normal position, so that the prolongations of the wedges 5 no longer register with the notches in the plate, then the wedges are held up, and as the head comes down the head-grip is necessarily released. The plate 4 is pushed out of its normal position by means of a wedge $k$ on the upper end of one of the standard gripping-wedges 6, and this wedge is forced upward when the gripping-wedge rises (being lifted by the treadle-lever, as heretofore explained) to lift the standard-grip, and by this means both grips are released at the same time. The face view of the wedge having this releasing-wedge is shown in Fig. 7. I have shown a taper on each side of the lifting-bar; but I do not confine myself to these duplications on opposite sides. A wearing-plate may be provided for the faces of the lifting-bar, if desired, as in my patent, No. 391,692, of October 23, 1888.

I claim as my invention—

1. In combination, a standard, a head, and a suitable lifting-lever, with gripping mechanisms in the standard and head, and a lifting-bar having a separate taper for each gripping mechanism, substantially as described.

2. In combination, the standard, the head, and suitable lifting-lever, duplicate gripping mechanisms for the standard and head, and a lifting-bar having duplicate tapers, one set for each gripping mechanism, arranged in relation to each other substantially as described.

3. In combination with the standard and a lifting-bar, a gripping-wedge in the standard, a head having gripping-wedges with extensions downward, a plate having notches to receive these extensions when the plate is in normal position, and a projection on the standard-wedges, adapted to move the plate out of normal position when the standard-wedges are raised, substantially as and for the purpose explained.

In testimony whereof I have signed my name to this specification in the presence of two subscribing witnesses.

LOUIS J. CRECELIUS.

Witnesses:
 CHAS. G. THOMPSON,
 C. D. GREENE, Jr.